United States Patent
Chang et al.

(10) Patent No.: US 10,109,053 B2
(45) Date of Patent: *Oct. 23, 2018

(54) APPARATUS AND METHOD FOR DETECTING ERROR IN LESION CONTOUR, APPARATUS AND METHOD FOR CORRECTING ERROR IN LESION CONTOUR, AND APPARATUS FOR INSPECTING ERROR IN LESION CONTOUR

(71) Applicant: Samsung Electronics Co., Ltd., Suwon-si, Gyeonggi-do (KR)

(72) Inventors: Chu-Ho Chang, Yongin-si (KR); Yeong-Kyeong Seong, Suwon-si (KR); Moon-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,199

(22) Filed: Jun. 1, 2017

(65) Prior Publication Data
US 2017/0262990 A1   Sep. 14, 2017

Related U.S. Application Data

(60) Continuation of application No. 14/611,602, filed on Feb. 2, 2015, now Pat. No. 9,697,611, which is a (Continued)

(30) Foreign Application Priority Data

Nov. 3, 2011   (KR) .................. 10-2011-0114143

(51) Int. Cl.
| | | |
|---|---|---|
| *G06T 7/00* | (2017.01) | |
| *G06T 7/174* | (2017.01) | |
| *G06T 7/11* | (2017.01) | |

(52) U.S. Cl.
CPC .......... *G06T 7/0016* (2013.01); *G06T 7/0012* (2013.01); *G06T 7/11* (2017.01);
(Continued)

(58) Field of Classification Search
CPC ......... G06T 7/0012; G06T 2207/30096; G06T 2207/30068
See application file for complete search history.

(56) References Cited

U.S. PATENT DOCUMENTS

| 7,689,016 B2 | 3/2010 | Stoecker et al. |
| 7,697,742 B2 | 4/2010 | Dehmeshki |
(Continued)

FOREIGN PATENT DOCUMENTS

| JP | 07-073291 A | 3/1995 |
| JP | 2004-216171 A | 8/2004 |
(Continued)

*Primary Examiner* — Utpal Shah
(74) *Attorney, Agent, or Firm* — Jefferson IP Law, LLP

(57) ABSTRACT

An apparatus for detecting an error in a contour of a lesion includes an extracting unit configured to extract a contour of a lesion in each of a plurality of two-dimensional image frames that form a three-dimensional image, and an error determining unit configured to determine a presence or an absence of an error in a contour of a lesion in a target image frame of the two-dimensional image frames based on estimation information about the lesion in the target image frame and/or an energy value that corresponds to the contour of the lesion in the target image frame.

20 Claims, 22 Drawing Sheets

Related U.S. Application Data division of application No. 13/668,068, filed on Nov. 2, 2012, now Pat. No. 8,977,052.

(52) U.S. Cl.
CPC .... *G06T 7/174* (2017.01); *G06T 2207/10072* (2013.01); *G06T 2207/30068* (2013.01); *G06T 2207/30096* (2013.01)

(56) References Cited

U.S. PATENT DOCUMENTS

| | | | |
|---|---|---|---|
| 7,783,094 B2 | 8/2010 | Collins et al. | |
| 7,876,939 B2* | 1/2011 | Yankelevitz | A61B 5/1075 |
| | | | 382/128 |
| 8,086,002 B2 | 12/2011 | Zhang et al. | |
| 8,379,950 B2 | 2/2013 | Ye et al. | |
| 8,577,101 B2 | 11/2013 | Avila | |
| 2008/0143718 A1* | 6/2008 | Ray | G06K 9/4638 |
| | | | 345/424 |
| 2009/0226060 A1 | 9/2009 | Gering et al. | |
| 2011/0116606 A1 | 5/2011 | Yankelevitz et al. | |
| 2011/0182489 A1* | 7/2011 | Chang | A61B 8/08 |
| | | | 382/128 |
| 2011/0188722 A1 | 8/2011 | Huang | |
| 2011/0211057 A1 | 9/2011 | Iwase et al. | |
| 2012/0027278 A1* | 2/2012 | Chaney | G06K 9/621 |
| | | | 382/131 |
| 2013/0170720 A1* | 7/2013 | Hu | G06K 9/6207 |
| | | | 382/131 |
| 2013/0202173 A1 | 8/2013 | Buckler et al. | |
| 2014/0037177 A1* | 2/2014 | Endo | G06T 11/00 |
| | | | 382/131 |
| 2014/0064580 A1* | 3/2014 | Madabhushi | G06T 7/0012 |
| | | | 382/128 |
| 2015/0030219 A1* | 1/2015 | Madabhushi | G06T 7/0089 |
| | | | 382/128 |

FOREIGN PATENT DOCUMENTS

| | | |
|---|---|---|
| JP | 2010-017370 A | 1/2010 |
| JP | 2011512999 | 4/2011 |
| KR | 10-2007-0083467 A | 8/2007 |
| KR | 10-2008-0021723 A | 3/2008 |
| KR | 10-2008-0070767 A | 7/2008 |
| KR | 10-2011-0091739 A | 5/2013 |
| WO | 2006/128302 A1 | 12/2006 |
| WO | 2007/059615 A1 | 5/2007 |

* cited by examiner

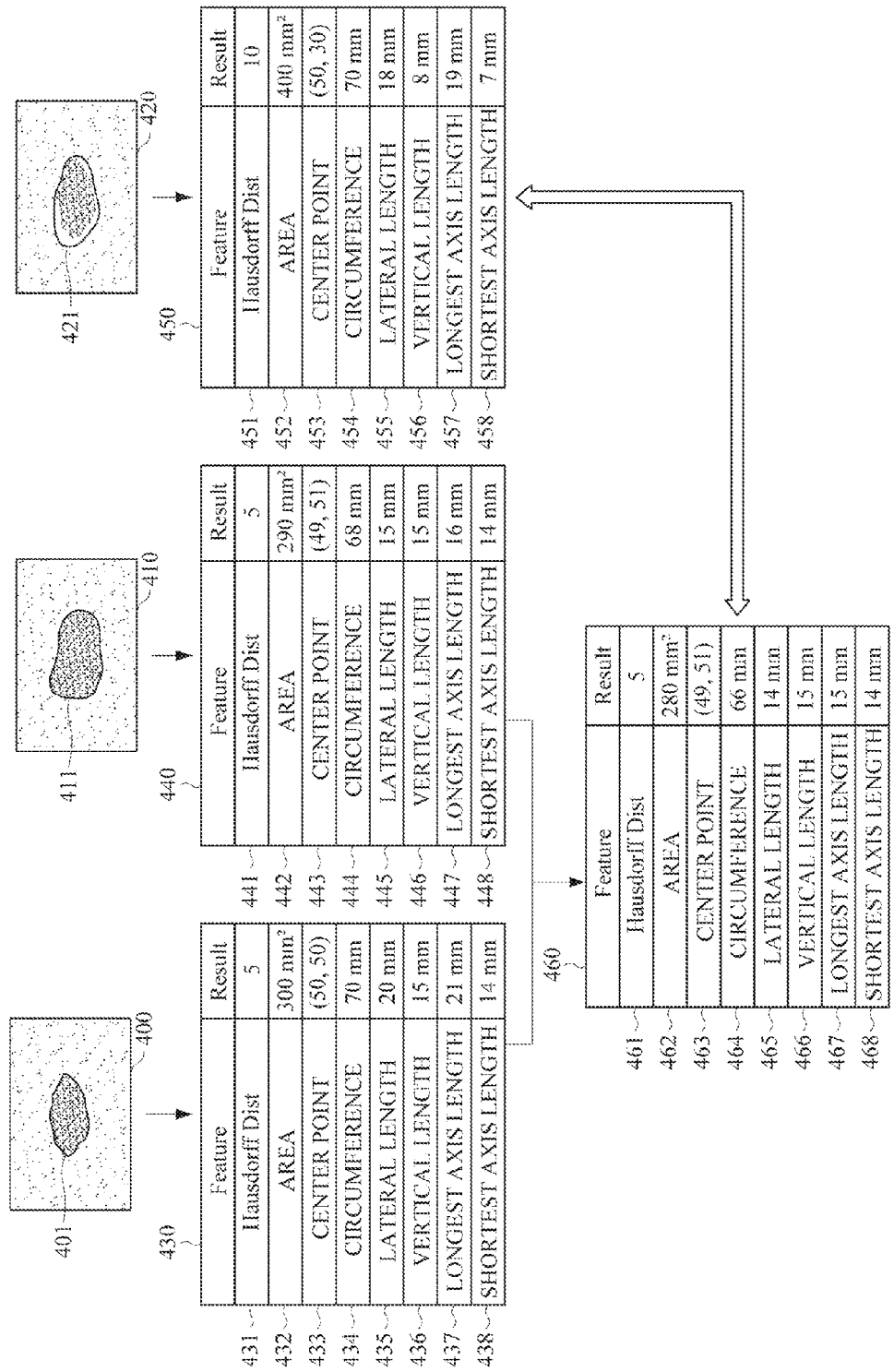

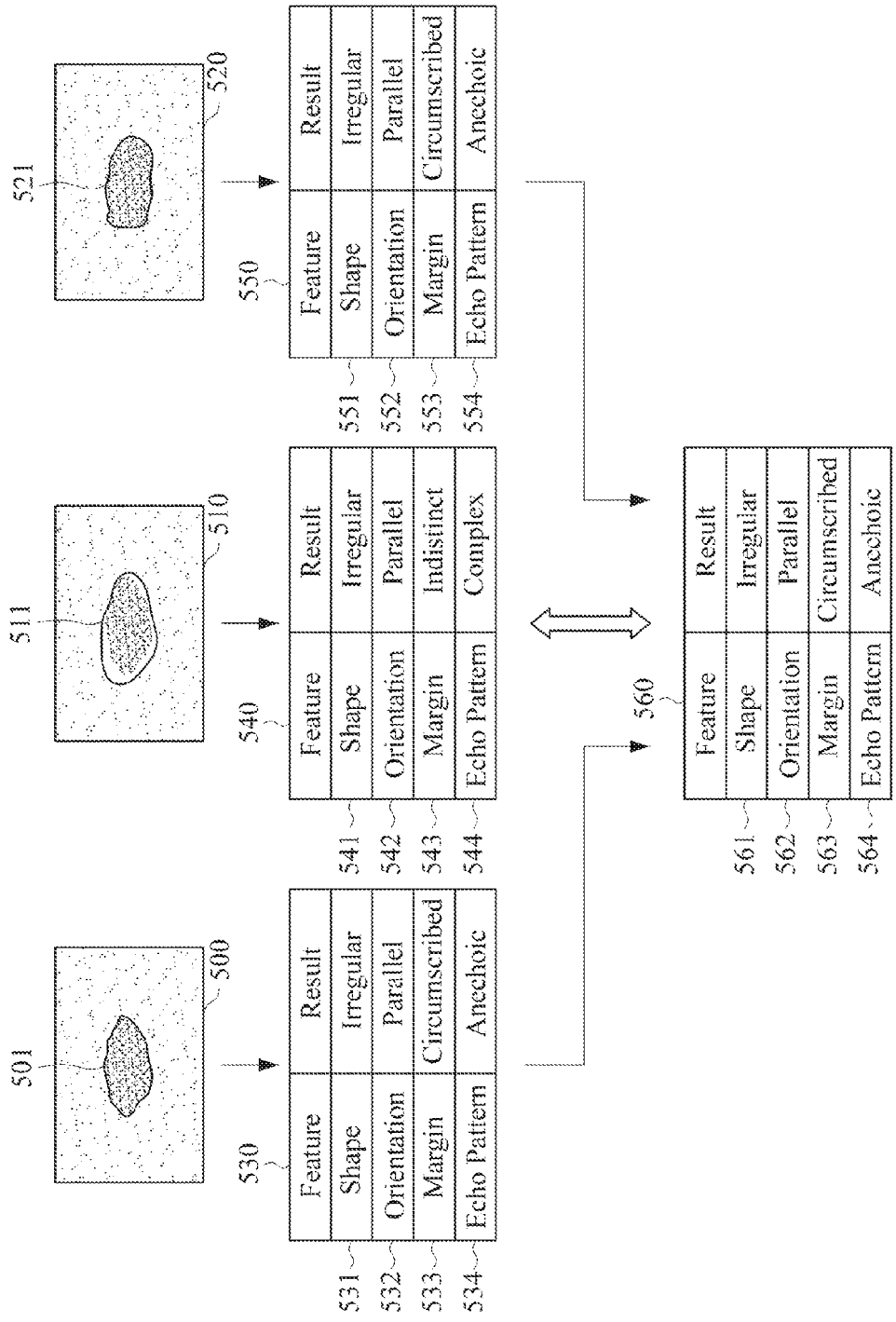

FIG. 6

| Feature | WEIGHT | DETERMINATION RESULT | DETERMINATION RESULT VALUE | ERROR VALUE |
|---|---|---|---|---|
| Shape | 3 | ERROR X | 0 | 0 |
| Orientation | 3 | ERROR X | 0 | 0 |
| Margin | 3 | ERROR O | 1 | 3 |
| Echo Pattern | 1 | ERROR O | 1 | 1 |
| Hausdorff Dist | 3 | ERROR O | 1 | 3 |
| AREA | 1 | ERROR O | 1 | 1 |
| CENTER POINT | 2 | ERROR X | 0 | 0 |
| CIRCUMFERENCE | 1 | ERROR X | 0 | 0 |
| SHORTEST AXIS LENGTH | 1 | ERROR O | 1 | 1 |
| SUM | X | X | 5 | 9 |

FIG. 7

| Case | RESULT OF DETERMINATION BASED ON ENERGY VALUE | RESULT OF DETERMINATION BASED ON ESTIMATION INFORMATION | FINAL DETERMINATION |
|---|---|---|---|
| 1 | ERROR X | ERROR X | ERROR X |
| 2 | ERROR X | ERROR O | RE-DETERMINE PRESENCE OR ABSENCE OF ERROR AFTER CORRECTION OF LESION CONTOUR |
| 3 | ERROR O | ERROR X | RE-DETERMINE PRESENCE OR ABSENCE OF ERROR AFTER CORRECTION OF LESION CONTOUR |
| 4 | ERROR O | ERROR O | ERROR O |

| Feature | Result |
|---|---|
| Hausdorff Dist | 5 |
| AREA | 300 mm² |
| CENTER POINT | (50, 50) |
| CIRCUMFERENCE | 70 mm |
| LATERAL LENGTH | 20 mm |
| VERTICAL LENGTH | 15 mm |
| LONGEST AXIS LENGTH | 21 mm |
| SHORTEST AXIS LENGTH | 14 mm |

1040

| Feature | Result |
|---|---|
| Hausdorff Dist | 10 |
| AREA | 400 mm² |
| CENTER POINT | (50, 30) |
| CIRCUMFERENCE | 70 mm |
| LATERAL LENGTH | 18 mm |
| VERTICAL LENGTH | 8 mm |
| LONGEST AXIS LENGTH | 19 mm |
| SHORTEST AXIS LENGTH | 7 mm |

FIG. 10C

| Feature | Result |
|---|---|
| Hausdorff Dist | 5 |
| AREA | 290 $mm^2$ |
| CENTER POINT | (49, 51) |
| CIRCUMFERENCE | 68 mm |
| LATERAL LENGTH | 15 mm |
| VERTICAL LENGTH | 15 mm |
| LONGEST AXIS LENGTH | 16 mm |
| SHORTEST AXIS LENGTH | 14 mm |

|  | ENERGY VALUE | SIMILARITY | SUM OF ENERGY VALUE AND SIMILARITY |
|---|---|---|---|
| FIRST LESION CONTOUR CANDIDATE | 30 | 10 | 40 |
| SECOND LESION CONTOUR CANDIDATE | 25 | 12 | 37 |
| THIRD LESION CONTOUR CANDIDATE | 23 | 19 | 42 |

APPARATUS AND METHOD FOR DETECTING ERROR IN LESION CONTOUR, APPARATUS AND METHOD FOR CORRECTING ERROR IN LESION CONTOUR, AND APPARATUS FOR INSPECTING ERROR IN LESION CONTOUR

CROSS-REFERENCE TO RELATED APPLICATION(S)

This application is a continuation application of prior application Ser. No. 14/611,602, filed on Feb. 2, 2015, which is a division of prior application Ser. No. 13/668,068 filed on Nov. 2, 2012, which has issued as U.S. Pat. No. 8,977,052 on Mar. 10, 2015 and claimed the benefit of Korean Patent Application No. 10-2011-0114143 filed on Nov. 3, 2011, in the Korean Intellectual Property Office, the entire disclosure of each which is hereby incorporated by reference.

BACKGROUND

1. Field

The following description relates to a technology for extracting a contour of a lesion in each of a plurality of two-dimensional image frames that form a three-dimensional image, and detecting and correcting an error, if any, in the extracted contour.

2. Description of the Related Art

Recently, medical equipment capable of obtaining a three-dimensional lesion image has been introduced to overcome limitations in a two-dimensional image. A three-dimensional image includes a number of two-dimensional images.

However, noise, poor resolution, and low contrast of an image make it difficult to accurately extract a contour of a lesion in an image. Thus, the extracted contour of the lesion in the image is likely to have an error. Especially for a three-dimensional image that is formed of a number of two-dimensional images, it is difficult to detect and correct an error, if any, in an extracted contour of a lesion in each of the two-dimensional images.

Therefore, there is a need for a technology to easily detect the presence or absence of an error in a contour of a lesion and correct an error, if any, in the contour of the lesion.

SUMMARY

According to an aspect, an apparatus for detecting an error in a contour of a lesion includes an extracting unit configured to extract a contour of a lesion in each of a plurality of two-dimensional image frames that form a three-dimensional image; and an error determining unit configured to determine a presence or an absence of an error in the contour of the lesion in a target image frame of the two-dimensional image frames based on estimation information about the lesion in the target image frame and/or an energy value that corresponds to the contour of the lesion in the target image frame.

The estimating unit may be configured to generate the estimation information about the lesion in the target image frame based on information about the lesion in at least one of the two-dimensional image frames that precedes the target image frame and/or is subsequent to the target image frame.

The estimating unit may be further configured to generate the estimation information about the lesion in the target image frame based on changes in information about the lesion in at least two of the two-dimensional image frames that precede the target image frame and/or are subsequent to the target image frame.

The information about the lesion in the at least one of the two-dimensional image frames may include any one of the following information or any combination of the following information: information about a shape of a lesion image in the at least one of the two-dimensional image frames; information about an orientation of the lesion image; information about a margin of the lesion image; information about an echo pattern of the lesion image; information about an area of the lesion enclosed by the contour of the lesion; information about a center point of the contour of the lesion; information about a circumference of the contour of the lesion; information about a lateral length of the contour of the lesion; information about a vertical length of the contour of the lesion; information about a longest axis length of the lesion contour; and information about a shortest axis length of the lesion contour.

The apparatus may further include a calculating unit configured to calculate the energy value that corresponds to the contour of the lesion in the target image frame based on information about pixels in surroundings of the contour of the lesion in the target image frame.

The error determining unit may be further configured to determine the presence or the absence of the error in the contour of the lesion in the target image frame based on a result of a comparison between a predefined energy value and the energy value corresponding to the contour of the lesion in the target image frame.

The error determining unit may be further configured to determine the presence or the absence of the error in the contour of the lesion in the target image frame based on a distribution of energy values that correspond to the contours of the lesions in the two-dimensional image frames.

The error determining unit may be further configured to determine the presence or the absence of the error in the contour of the lesion in the target image frame based on a result of a comparison between detailed information about the lesion in the target image frame and detailed information of the estimation information about the lesion in the target image frame; and make a final determination of the presence or the absence of the error in the contour of the lesion in the target image frame based on a result of the determination.

According to an aspect, an apparatus for correcting an error in a contour of a lesion includes an extracting unit configured to extract a contour of a lesion in each of a plurality of two-dimensional image frames that form a three-dimensional image; a generating unit configured to generate a reference lesion contour based on the contour of the lesion in at least one of the two-dimensional image frames that precedes the target image frame and/or is subsequent to a target image frame of the two-dimensional image frames; and a changing unit configured to modify the reference lesion contour to produce a plurality of lesion contour candidates; and change the contour of the lesion in the target image frame to one of the lesion contour candidates.

The generating unit may be further configured to overlay at least two of the two-dimensional image frames that precede the target image frame and/or are subsequent to the target image frame on each other to overlay the lesions in the at least two of the two-dimensional image frames on each other; and set, as the reference lesion contour, an outermost contour of the overlaid lesions, or an innermost contour of the overlaid lesions, or an intermediate contour of the overlaid lesions, or an average contour of the overlaid lesions.

The generating unit may be further configured to estimate the contour of the lesion in the target image frame based on changes in the contours of the lesions in at least two of the two-dimensional image frames that precede the target image frame and/or subsequent to the target image frame; and set the estimated contour as the reference lesion contour.

The changing unit may be further configured to modify the reference lesion contour within a pre-set range to produce the lesion contour candidates.

The changing unit may be further configured to calculate energy values that correspond to the lesion contour candidates based on information about pixels in surroundings of the lesion contour candidates; calculate a similarity between each of the lesion contour candidates and the reference lesion contour; and select one of the lesion contour candidates based on the calculated energy values and the calculated similarities.

According to an aspect, an apparatus for inspecting an error in a contour of a lesion, the apparatus includes an extracting unit configured to extract a contour of a lesion in each of a plurality of two-dimensional image frames that form a three-dimensional image; an error determining unit configured to determine a presence or an absence of an error in the contour of the lesion in a target image frame of the two-dimensional image frames based on estimation information about the lesion in the target image frame and/or an energy value that corresponds to the contour of the lesion in the target image frame; a generating unit configured to, in response to a determination by the error determining unit that the error is present in the contour of the lesion in the target image frame, generate a reference lesion contour based on the contour of the lesion in at least one of the two-dimensional image frames that precedes the target image frame and/or is subsequent to the target image frame; and a changing unit configured to modify the reference lesion contour to generate a plurality of lesion contour candidates; and change the contour of the lesion in the target image frame to one of the lesion contour candidates.

The apparatus may further include an estimating unit configured to generate the estimation information about the lesion in the target image frame based on information about the lesion in at least one of the two-dimensional image frames that precedes the target image frame and/or is subsequent to the target image frame.

The estimating unit may be further configured to generate the estimation information about the lesion in the target image frame based on changes in information about the lesions in at least two of the two-dimensional image frames that precede the target image frame and/or are subsequent to the target image frame.

The apparatus may further include a calculating unit configured to calculate the energy value that corresponds to the contour of the lesion in the target image frame based on information about pixels in surroundings of the contour of the lesion in the target image frame.

The error determining unit may be further configured to determine the presence or the absence of the error in the contour of the lesion in the target image frame based on a result of a comparison between a predefined energy value and the energy value corresponding to the contour of the lesion in the target image frame, or based on a distribution of energy values that correspond to contours of lesions in the two-dimensional image frames.

The error determining unit may be further configured to determine the presence or the absence of the error in the contour of the lesion in the target image frame based on a result of a comparison between detailed information about the lesion in the target image frame and detailed information of the estimation information about the lesion in the target image frame; and make a final determination on the presence or the absence of the error in the contour of the lesion based on a result of the determination.

The generating unit may be further configured to set, as the reference lesion contour, a lesion contour that is generated based on the estimation information about the lesion in the target image frame.

The changing unit may be further configured to modify the reference lesion contour within a pre-set range to produce the lesion contour candidates.

The generating unit may be further configured to overlay at least two of the two-dimensional image frames that precede the target image frame and/or are subsequent to the target image frame on each other to overlay the lesions in the at least two of the two-dimensional image frames on each other; and set, as the reference lesion contour, an outermost contour of the overlaid lesions, or an innermost contour of the overlaid lesions, or an intermediate contour of the overlaid lesions, or an average contour of the overlaid lesions.

The changing unit may be further configured to calculate energy values that correspond to the lesion contour candidates based on information about pixels in surroundings of the lesion contour candidates; calculate a similarity between each of the lesion contour candidates and the reference lesion contour; and select one of the lesion contour candidates based on the calculated energy values and the calculated similarities.

According to an aspect, a method of detecting an error in a contour of a lesion includes extracting a contour of a lesion in each of a plurality of two-dimensional image frames that form a three-dimensional image; and determining a presence or an absence of an error in a contour of a lesion in a target image frame of the two-dimensional image frames based on estimation information about the lesion in the target image frame and/or an energy value that corresponds to the contour of the lesion in the target image frame.

According to an aspect, a method of correcting an error in a contour of a lesion includes extracting a contour of a lesion in each of a plurality of two-dimensional image frames that form a three-dimensional image; generating a reference lesion contour based on a contour of the lesion in at least one of the two-dimensional image frames that precedes a target image frame of the two-dimensional image frames and/or is subsequent to the target image frame of the two-dimensional image frames; modifying the reference lesion contour to produce a plurality of lesion contour candidates; and changing the contour of the lesion in the target image frame to one of the plurality of lesion contour candidates.

According to an aspect, an apparatus for detecting an error in a contour of a lesion includes an extracting unit configured to extract a contour of a lesion in each of a plurality of two-dimensional image frames that form a three-dimensional image; and an error determining unit configured to determine a presence or an absence of an error in the contour of the lesion in a target image frame of the two-dimensional image frames based on information about the lesions in at least two of the two-dimensional image frames that precede the target frame image and/or are subsequent to the target frame image in a sequence of the two-dimensional images.

The at least two of the two-dimensional image frames may include at least one of the two-dimensional images that precedes the target image frame and at least one of the two-dimensional images that is subsequent to the target image frame; or at least two of the two-dimensional images that precede the target image frame and none of the two-dimensional image frames that is subsequent to the target image frame; or none of the two-dimensional images that precede the target image frame and at least two of the two-dimensional image frames that is subsequent to the target image frame.

The information about the lesions in the at least two of the two-dimensional image frames may include feature information of a lesion image and/or feature information of a lesion contour.

The feature information of the lesion image may include a plurality of characteristics of the lesion image; and the feature information of the lesion contour may include a plurality of characteristics of the lesion contour.

The apparatus may further include an estimating unit configured to generate estimation information about the lesion in the target image frame based on the information about the lesions in the at least two of the two-dimensional image frames; and the error determining unit may be further configured to determine the presence or the absence of the error in the contour of the lesion in the target image frame based a comparison between information of the lesion in the target image frame and the estimation information of the lesion in the target image frame.

The apparatus of may further include a calculating unit configured to calculate an energy value of the contour of the lesion in the target image and an energy value of the contour of the lesion in each of the at least two of the two-dimensional image frames; and the error determining may be further configured to determine the presence or the absence of the error in the contour of the lesion in the target image frame based a comparison between the energy value of the contour of the lesion in the target image and the energy value of the contour of the lesion in each of the at least two of the two-dimensional image frames.

Other features and aspects will be apparent from the following detailed description, the drawings, and the claims.

BRIEF DESCRIPTION OF THE DRAWINGS

FIG. 4 is a diagram illustrating another example of a process of an error detection apparatus that detects an error in a contour of a lesion.

FIG. 5 is a diagram illustrating another example of a process of an error detection apparatus that detects an error in a contour of a lesion.

FIG. 6 is a diagram for describing another example of a process of an error detection apparatus that detects an error in a contour of a lesion.

FIG. 7 is a diagram for describing another example of a process of an error detecting apparatus that detects an error in a contour of a lesion.

FIGS. 10A to 10D are diagrams illustrating another example of a process of an error correction apparatus that generates a reference lesion contour.

FIGS. 11A to 11E are diagrams illustrating an example of a process of an error correction apparatus that selects one of lesion contour candidates.

DETAILED DESCRIPTION

Figure 1:
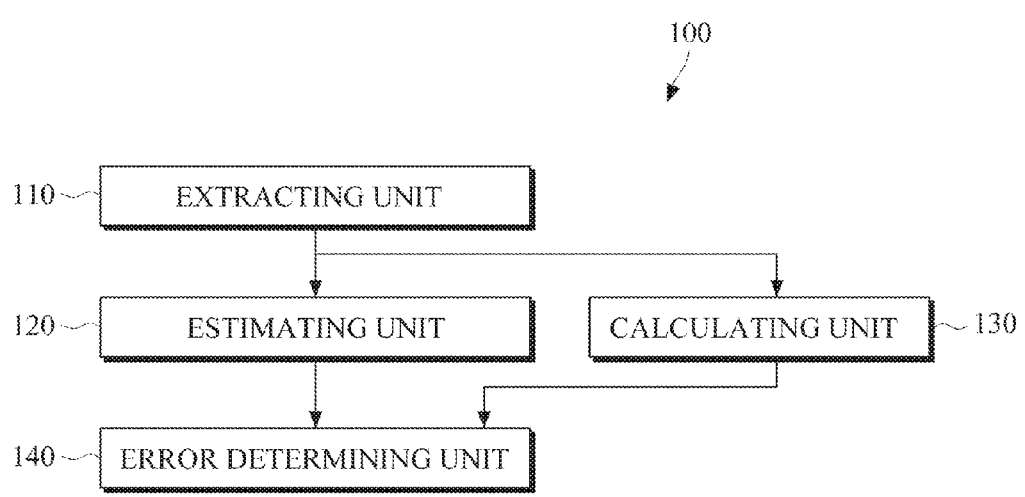
FIG. 1 is a diagram illustrating an example of an apparatus for detecting an error in a contour of a lesion.

The following description is provided to assist the reader in gaining a comprehensive understanding of the methods, apparatuses, and/or systems described herein. However, various changes, modifications, and equivalents of the methods, apparatuses, and/or systems described herein will be apparent to those of ordinary skill in the art. Also, descriptions of well-known functions and constructions may be omitted for increased clarity and conciseness.

Throughout the drawings and the detailed description, the same drawing reference numerals refer to the same elements. The relative size and depiction of these elements may be exaggerated for clarity, illustration, and convenience.

FIG. 1 is a diagram illustrating an example of an apparatus for detecting an error in a contour of a lesion. Referring to FIG. 1, an apparatus 100 includes an extracting unit 110, an estimating unit 120, a calculating unit 130, and an error determining unit 140.

The extracting unit 110 extracts a contour of a lesion in each of a plurality of two-dimensional image frames that form a three-dimensional image. For example, the extracting unit 110 may perform image segmentation on the two-dimensional image frames to extract a contour of a lesion in each of the two-dimensional image frames. Image segmentation is well known in the art, and thus will not be described in detail here.

The estimating unit 120 generates estimation information about a lesion in a target image frame based on information on a lesion in at least one of two-dimensional image frames preceding and subsequent to the target image frame in a sequence of the two-dimensional frame images.

The estimation information is information about a lesion in a target image frame that is estimated based on information about lesions in the at least one of two-dimensional image frames preceding and subsequent to the target image frame.

The information about a lesion may include feature information of a lesion image and feature information of a lesion contour. Examples of the feature information of a lesion image may include information about a shape of the lesion image in a target image frame, information about the orientation of the lesion image, information about a margin of the lesion image, information about an echo pattern of the lesion image, and the like. Examples of the feature information of a lesion contour may include a similarity between neighboring lesion contours, the area of a lesion enclosed by a contour, the center point of a lesion contour, the circumference of a lesion contour, a lateral length of a lesion contour, a vertical length of a lesion contour, a longest axis length of the lesion contour, a shortest axis length of the lesion contour, and the like.

For mammography, for example, the feature information of a lesion image may be information for use in a breast imaging-reporting and data system (BI-RADS).

The estimating unit 120 may generate estimation information about a lesion on the basis of changes in information of a lesion in at least one of two-dimensional image frames preceding and subsequent to a target image frame. By doing so, the estimating unit 120 is able to reflect changes in a lesion in the estimation information.

The calculating unit 130 calculates an energy value that corresponds to a contour of a lesion in the target image frame on the basis of information about pixels on the contour of the lesion in the target image frame.

The information of the pixel may include a pixel value, a gradient value, and the like. The pixel value is a digital value obtained from digitizing detected light. For example, in the case of the use of an 8-bit digital value, the detected light may be represented by a number ranging from 0 to 255. The brightest color may be represented by 0 and the darkest color may be represented by 255. Alternatively, the brightest color may be represented by 255 and the darkest color may be represented by 0. In addition, the digital value may be a 12-bit digital value, a 16-bit digital value, or the like.

In one example, the calculating unit 130 may define a difference between information of pixels inside the contour of the lesion and information of pixels outside the contour as a predefined energy value (or an energy function). For example, the predefined energy value may be defined according to the brightness ratio between regions inside and outside the contour of the lesion. The energy value may be used for various purposes, such as determining how accurately an extracted contour of a lesion matches a contour of a lesion in an actual image.

For example, an energy value of a given image frame that does not fall within a predetermined threshold range may indicate that a contour of a lesion in the given image frame is different from an actual contour of the lesion. In addition, an energy value of a given image frame that is appreciably different from an energy value of an adjacent image frame (for example, a preceding or subsequent image frame) may indicate that a contour of the lesion in the given image frame is different from an actual contour of the lesion.

If the energy value is specified according to the brightness ratio, the sharpness of the contour may be able to be set by the energy value. However, this is only for purposes of example, and there may be no relation between the sharpness and the presence of a lesion and between the sharpness and the presence of an error in the contour of a lesion.

The error determining unit 140 determines whether or not an error is present on a contour of the lesion in the target image frame among the two-dimensional image frames based on the estimation information about the lesion in the target image frame and/or the energy value corresponding to the contour of the lesion in the target image frame. The estimation information is generated by the estimating unit 120 and the energy value is obtained by the calculating unit 130.

For example, the error determining unit 140 may determine the presence or absence of an error in the contour of the lesion in the target image frame based on a result of a comparison between the energy value corresponding to the contour of the lesion in the target image frame and a predefined energy value. For example, if the energy value corresponding to the contour of the lesion is smaller than the predefined energy value, the error determining unit 140 may determine that there is an error in the contour of the lesion. The determination will be described in detail later with reference to FIG. 2.

As another example, the error determining unit 140 may determine whether an error is present on the contour of the lesion in the target image frame based on the distribution of energy values that correspond to contours of lesions in the respective two-dimensional image frames. The error determining unit 140 may extract an image frame having a significantly larger energy value or smaller energy value compared to other image frames on the basis of the distribution of the energy values in the two-dimensional image frames. The error determining unit 140 may determine that an error is present in a contour of a lesion in the extracted image frame. An image frame having a larger or smaller energy value than other image frames is more likely to have an error in a contour of a lesion therein. The determination based on the energy value will be described in detail later with reference to FIGS. 3A and 3B.

The error determining unit 140 may determine the presence or absence of an error in a contour of a lesion in the target image frame based on a result of a comparison between detailed information about the lesion in the target image frame and detailed information of the estimation information. This will be described in detail later with reference to FIGS. 4 to 6.

Accordingly, the apparatus 100 is capable of accurately detecting an error in a contour of a lesion in the target image frame based on the estimation information about the lesion in the target image frame or the energy value that corresponds to the contour of the lesion.

Also, the apparatus 100 is capable of accurately detecting an error in a contour of the lesion in the target image frame among a plurality of two-dimensional image frames based on information about lesions in a preceding image frame and a subsequent image frame.

Figure 2:
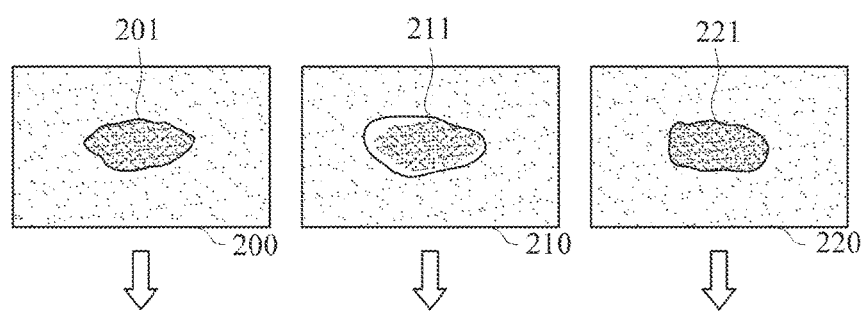
FIG. 2 is a diagram illustrating an example of a process of an error detection apparatus that detects an error in a contour of a lesion.

FIG. 2 is a diagram illustrating an example of a process of an error detection apparatus that detects an error in a contour of a lesion. Referring to FIG. 2, the apparatus extracts a first lesion contour 201, a second lesion contour 211, and a third lesion contour 221 from a first image frame 200, a second image frame 210, and a third image frame 220, respectively. The first image frame 200, the second image frame 210, and the third image frame 220 form a three-dimensional image.

The example illustrated in FIG. 2 assumes that an energy value is a difference between a pixel value inside a contour of a lesion and a pixel value outside the contour of the lesion, and an image frame having a smaller energy value is more likely to have an error in a contour of a lesion therein.

In the example illustrated in FIG. 2, the apparatus calculates energy values '100,' '30,' and '105' respectively corresponding to the first, second, and third lesion contours 201, 211, and 221 based on information about pixels in the surroundings of the lesion contours 201, 211, and 221 in the respective first, second, and third image frames 200, 210, and 220.

The apparatus determines the presence or absence of an error in a contour of a lesion in each of the first, second, and third image frames 200, 210, and 220 based on a result of a comparison between a predefined energy value and each of the energy values '100,' '30,' and '105' that correspond to the first, second, and third lesion contours 201, 211, and 221, respectively. The example illustrated in FIG. 2 assumes that the apparatus confirms the presence or absence of an error in a contour of a lesion when an energy value corresponding to the contour of the lesion is smaller than a predefined energy value '40.' However, the predefined energy value may be varied by a user. In this case, the apparatus determines that no error is present in the contours of the lesions in the first image frame 200 and the third image frame 220 that have the corresponding energy values '100' and '105' greater than the predefined energy value '40.' In addition, the apparatus determines that an error is present in the contour of the lesion in the second image frame 210 that has the corresponding energy value '30' smaller than the predefined energy value '40.' In the example illustrated in FIG. 2, 'O' indicates the presence of an error, and 'X' indicates the absence of an error.

The apparatus is capable of accurately detecting an error in a contour of a lesion by determining the presence or absence of the error based on an energy value that corresponds to the contour of the lesion.

Figure 3A:
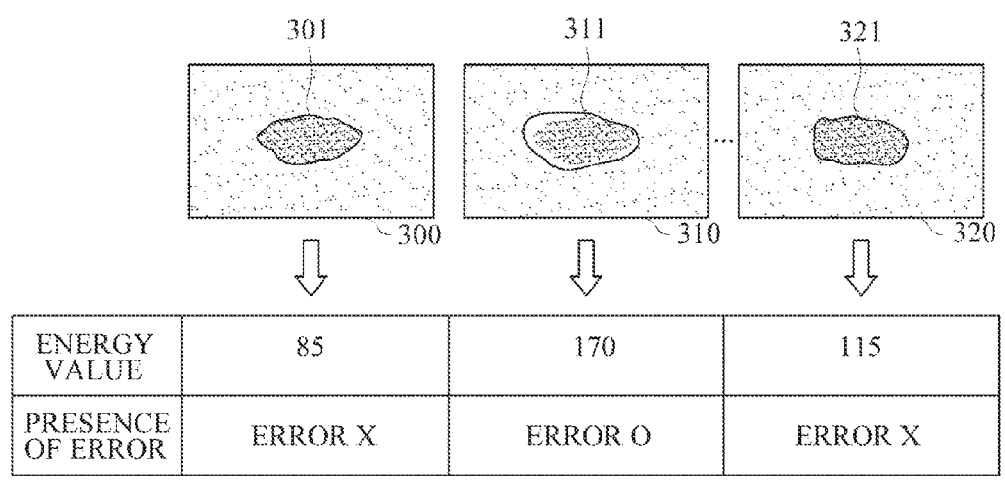
FIGS. 3A and 3B are diagrams illustrating another example of a process of an error detection apparatus that detects an error in a contour of a lesions.
Figure 3B:
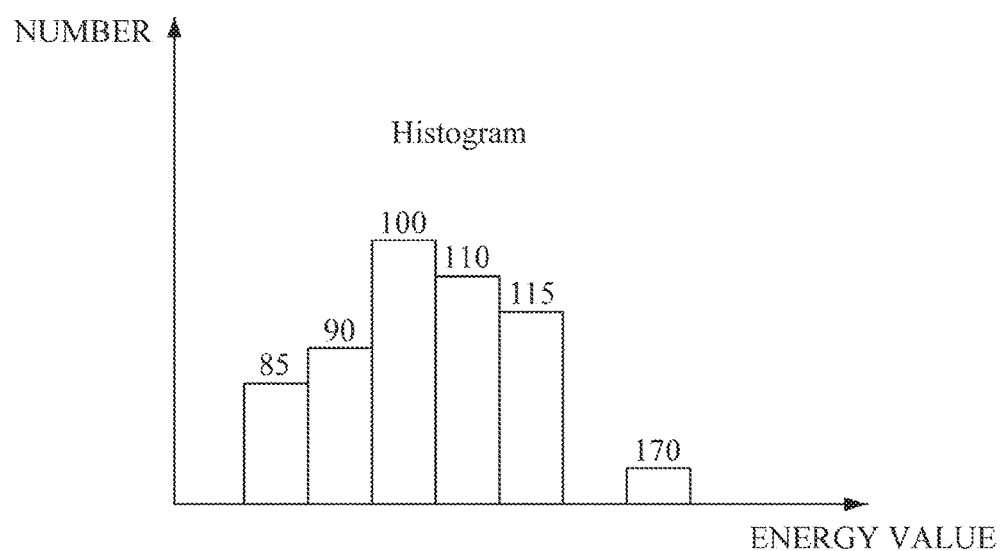

FIGS. 3A and 3B are diagrams illustrating another example of a process of an error detection apparatus that detects an error in a contour of a lesion.

Referring to FIG. 3A, the apparatus extracts a first lesion contour 301, a second lesion contour 311, and an N-th lesion contour 321 from a first image frame 300, a second image frame 310, through an N-th image frame 320, respectively. The first image frame 300, the second image frame 310, through the N-th image frame 320 form a three-dimensional image.

The apparatus calculates energy values '85,' '170,' and '115' that correspond to the respective first, second, and N-th lesion contours 301, 311, and 321 on the basis of information about pixels in the surroundings of the extracted lesion contours 301, 311, and 321 in the respective first, second, and N-th image frames 300, 310, and 320.

Referring to FIG. 3B, the apparatus determines the presence or absence of an error in each of the lesion contours 301, 311, and 321 based on the distribution of the energy values '85,' '170,' and '115' that correspond to the respective lesion contours 301, 311, and 321 in the N image frames. For example, N energy values corresponding to the first to N-th image frames 300, 310, and 320 may be represented in the form of a histogram as shown in FIG. 3B. In the example illustrated in FIG. 3A, 'O' indicates the presence of an error, and 'X' indicates the absence of an error.

The apparatus extracts an image frame that has an appreciably larger or smaller energy value than other image frames, and determines that an error is present in a contour of a lesion in the extracted image frame. In the example illustrated in FIGS. 3A and 3B, the apparatus determines that an error is present in a contour of a lesion in the second image frame 310 whose energy value '170' is much larger than the energy values of other image frames. On the other hand, the apparatus determines that there is no error in a contour of a lesion in the image frames 300 and 310 that have energy values that are similar to each other. In other words, a difference between an energy value of a given image frame and energy values of other image frames that does not fall within a predefined threshold range may indicate a high possibility of the presence of an error in a contour of a lesion in the given image frame.

Accordingly, the apparatus is capable of exactly detecting an error in a contour of a lesion by determining the presence of the error in the contour of the lesion based on the distribution of energy values that correspond to lesion contours.

FIG. 4 is a diagram illustrating another example of a process of an error detection apparatus that detects an error in a contour of a lesion. Referring to FIG. 4, the apparatus generates estimation information based on feature information about a contour of a lesion in a two-dimensional image frame preceding or subsequent to a target image frame. The apparatus determines the presence or absence of an error in a contour of a lesion in the target image frame based on the estimation information.

The apparatus extracts a first lesion contour 401, a second lesion contour 411, and a third lesion contour 421 from a first image frame 400, a second image frame 410, and a third image frame 420, respectively. The first image frame 400, the second image frame 410, and the third image frame 420 form a three-dimensional image. The example illustrated in FIG. 4 assumes that there are three image frames, but the number of image frames is not limited thereto.

In a case in which the third image frame 420 is a target image frame, the apparatus may generate estimation information about a lesion in the third image frame 420 based on information about lesions in the first and second image frames 400 and 410 that are obtained prior to the third image frame 420.

For example, the apparatus may extract first lesion information 430 about a lesion in the first image frame 400, second lesion information 440 about a lesion in the second image frame 410, and third lesion information 450 about a lesion in the third image frame 420. Each of the first, second, and third lesion information 430, 440, and 450 may include a similarity between neighboring lesion contours 431, 441, and 451, the area of a lesion enclosed by the contour 432, 442, and 452, a center point of a lesion contour 433, 443, and 453, a circumference of a lesion contour 434, 444, and 454, a lateral length of a lesion contour 435, 445, and 455, a vertical length of a lesion contour 436, 446, and 456, a longest axis length of a lesion contour 437, 447, and 457, and a shortest axis length of a lesion contour 438, 448, and 458. For example, the similarity 431, 441, and 451 may be measured based on the Hausdorff distance or based on a variety of other methods. In the example described herein, the smaller the Hausdorff distance is, the more similar the contours of the two adjacent lesions are.

The apparatus generates estimation information 460 about a lesion in the target image frame 420 based on changes in the first lesion information 430 of the first image frame 400 and the second lesion information 440 of the second image frame 410. For example, the apparatus may estimate area information 461 of the estimation information 460 as '280 mm$^2$' based on the change from '300 mm$^2$' to '290 mm$^2$' between the area information 432 of the first lesion information 430 and the area information 442 of the second lesion information 440. As another example, the apparatus may estimate vertical length information 466 of the estimation information 460 as '15 mm' based on the change from '15 mm' to '15 mm' between the vertical length information 436 of the first lesion information 430 and the vertical length information 446 of the second lesion information 440. In a similar manner, the apparatus estimates the remaining detailed estimation information 461, 463, 464, 465, 467, and 468 about the lesion in the target image frame 420.

The apparatus determines the presence or absence of an error in a contour of a lesion in the target image frame 420 based on a result of a comparison between the third lesion information 450 of the target image frame 420 and the estimation information 460. The example described herein will assume that the apparatus is configured to determine the presence of an error in a contour of a lesion in the target image frame 420 when the third lesion information 450 is 200% or more or 50% or less of the estimation information 460. For example, since the value '10' of the similarity information 451 in the third lesion information 450 of the target image frame 420 is 200% of the value '5' of the similarity information 461 in the estimation information 460, the apparatus determines the presence of an error in the contour of the lesion in the target image frame 420. As another example, since the value '7 mm' of the shortest axis length information 458 in the third lesion information 450 of the target image frame 420 is 50% of the value '14 mm' of the shortest axis length information 468 in the estimation information 460, the apparatus determines the presence of an error in the contour of the lesion in the target image frame 420. Through these operations, the apparatus determines the presence or absence of an error in the contour of the lesion in the target image frame 420 based on a result of a comparison between the detailed information of the lesion information 450 and the detailed information of the estimation information 460.

If the number of determinations that an error is present that have been made is greater than or equal to a predetermined number of determinations, the apparatus confirms the presence of an error in the contour of the lesion in the target image frame 420. If the predetermined number of determinations is set to 2, in the example illustrated in FIG. 4, the apparatus determines that an error is present in the contour of the lesion in the target image frame 420 because there have been 2 determinations that an error is present in the contour of the lesion, i.e., the determination based on the comparison between the similarity information 451 in the third lesion information 450 and the similarity information 461 in the estimation information 460 discussed above, and the determination based on the comparison between the shortest axis length information 458 in the third lesion information 450 and the shortest axis length information 468 in the estimation information 460 discussed above.

Accordingly, the apparatus is capable of accurately detecting an error in a contour of a lesion using estimation information about a lesion in a target image frame.

FIG. 5 is a diagram illustrating another example of a process of an error detection apparatus that detects an error in a contour of a lesion. Referring to FIG. 5, the apparatus generates estimation information based on feature information about a lesion in a two-dimensional image frame preceding or subsequent to a target image frame. The apparatus determines the presence or absence of an error in a contour of a lesion based on the estimation information.

The apparatus extracts a first lesion contour 501, a second lesion contour 511, and a third lesion contour 521 from a first image frame 500, a second image frame 510, and a third image frame 520, respectively. The first, second, and third image frames 500, 510, and 520 form a three-dimensional image. In the example illustrated in FIG. 5, there are three image frames, but the number of image frames is not limited thereto.

In a case in which the second image frame 510 is a target image frame, the apparatus generates estimation information about a lesion in the target image frame 510 based on information about a lesion in the first image frame 500 as an image frame preceding the target image frame 510, and information about a lesion in the third image frame 520 as an image frame subsequent to the target image frame 510.

For example, the apparatus extracts first lesion information 530 about a lesion in the first image frame 500, second lesion information 540 about a lesion in the second image frame 510, and third lesion information about 550 about a lesion in the third image frame 520. Each of the first, second, and third lesion information 530, 540, and 550 include feature information about a lesion image in the corresponding image frame, such as a shape of a lesion image, an orientation of a lesion image, a margin of a lesion image, an echo pattern of a lesion image, and the like.

The apparatus generates estimation information 560 about a lesion in the target image frame 510 based on the first and third lesion information 530 and 550 of the respective first and third image frames 500 and 520. For example, as shown in FIG. 5, shape information 531 of the first lesion information 530 and shape information 551 of the third lesion information 550 are 'irregular,' and thus the apparatus estimates shape information 561 of the estimation information 560 as 'irregular.' As another example, echo pattern information 534 of the first lesion information 530 and echo pattern information 554 of the third lesion information 550 are 'anechoic,' and thus the apparatus estimates echo pattern information 564 of the estimation information 560 as 'anechoic.' In a similar manner, the apparatus estimates the remaining detailed estimation information 562 and 563 about the lesion in the target image frame 510. Accordingly, the apparatus estimates orientation information 562 in the estimation information 560 for the second image frame 510 as 'parallel,' and estimates margin information 563 in the estimation information 560 for the second image frame 510 as 'circumscribed.' 'Parallel' indicates that the growth direction of the lesion is substantially identical to a growth direction of skin tissue.

The apparatus determines the presence or absence of an error in a contour of a lesion in the target image frame 510 based on a result of a comparison between the lesion information 540 of the target image frame 510 and the estimation information 560. For example, as shown in FIG. 5, since the margin information 543 in the second lesion information 540 is 'indistinct' and the margin information 563 in the estimation information 560 is 'circumscribed,' the apparatus determines that an error is present in the contour of the lesion in the target image frame 510. As another example, as shown in FIG. 5, since the echo pattern information 544 in the second lesion information 540 is 'complex' and the echo pattern information 564 in the estimation information 560 is 'anechoic,' the apparatus determines that an error is present in the contour of the lesion in the target image frame 510. Accordingly, based on a result of a comparison between the detailed estimation information in the second lesion information 540 and the detailed estimation information in the estimation information 560, the apparatus determines the presence or absence of an error in the contour of the lesion in the target image frame 510.

If the number of determinations that an error is present that have been made is greater than or equal to a predetermined number of determinations, the apparatus confirms the presence of an error in the contour of the lesion in the target image frame 510. If the predetermined number of determinations is set to 2, in the example illustrated in FIG. 5, the apparatus determines that an error is present in the contour of the lesion in the target image frame 510 because there have been 2 determinations that an error is present in the contour of the lesion, i.e., the determination based on the comparison between the margin information 543 in the second lesion information 540 and the margin information 563 in the estimation information 560 discussed above, and the determination based on the comparison between the echo pattern information 544 in the second lesion information 540 and the echo pattern information 564 in the estimation information 560 discussed above.

Accordingly, the apparatus is capable of accurately detecting an error in a contour of a lesion in a target image frame based on the estimation information about the lesion.

FIG. 6 is a diagram for describing another example of a process of an error detection apparatus that detects an error in a contour of a lesion. Referring to FIG. 6, the apparatus determines the presence or absence of an error in a contour of a lesion in a target image frame based on a result of a comparison between each detail of lesion information of the target image frame and each detail of estimation information. The details of the lesion information include shape information 600, orientation information 610, margin information 620, echo pattern information 630, similarity information 640, area information 650, center point information 660, circumference information 670, and shortest axis length information 680. The example illustrated in FIG. 6 assumes that the presence of an error is confirmed by the margin information 620, the echo pattern information 630, the similarity information 640, the area information 650, and the shortest axis length information 680 as a result of a comparison between the details of the lesion information about a lesion in a target image frame and the details of the estimation information. In the example illustrated in FIG. 6, a determination result of 'O' indicates the presence of an error, and a determination result of 'X' indicates the absence of an error.

The apparatus creates a determination result value on the basis of each determination result. The example illustrated in FIG. 6 assumes that a determination result value is '1' to indicate the presence of an error and a determination result value is '0' to indicate the absence of an error. The determination result values may be varied by a user.

The apparatus generates an error value by applying a weight to the each determination result value. The weights may be varied by a user. In the example illustrated in FIG. 6, a weight of '3' is applied to the shape information 600 determination result value, the orientation information 610 determination result value, the margin information 620 determination result value, and the similarity information 640 determination result value; a weight of '2' is applied to the center point information 660 determination result value; and a weight of '1' is applied to the echo pattern information 630 determination result value, the area information 650 determination result value, the circumference information 670 determination result value, and the shortest axis length information 680 determination result value.

The apparatus adds up the generated error values to obtain a sum of the generated error values. The apparatus makes a final determination on the presence or absence of an error in a contour of a lesion in a target image frame based on a result of a comparison between the sum of the generated error values and a predefined reference error value. In the example illustrated in FIG. 6, it is assumed that the predefined reference error value is '7,' and if the sum of the generated error values is greater than or equal to the predefined reference error value, the apparatus confirms the presence of an error in the contour of the lesion. In this case, since the sum of the generated error values, that is, '9,' is greater than the predefined reference error value '7,' the apparatus determines that an error is present in the contour of the lesion in the target image frame.

Accordingly, the apparatus is capable of accurately detecting an error in a contour of a lesion by determining the presence or absence of the error based on details of lesion information and further determining the presence or absence of the error based on the sum of weighted determination result values.

FIG. 7 is a diagram for describing another example of a process of an error detecting apparatus that detects an error in a contour of a lesion. Referring to FIG. 7, the apparatus determines the presence or absence of an error in a contour of a lesion in a target image frame based on an energy value that corresponds to a contour of the lesion and estimation information about the lesion in the target image frame, and makes a final determination based on both determination results. In the example illustrated in FIG. 6, a result of a determination of 'O' indicates the presence of an error, and a result of a determination of 'X' indicates the absence of an error.

For example, as shown in FIG. 7, if a result of a determination based on the energy value is 'the absence of an error' and a result of a determination based on the estimation information is 'the absence of an error' (case 1), the apparatus makes a final determination that there is no error present in a contour of the lesion in the target image frame.

Figure 8:
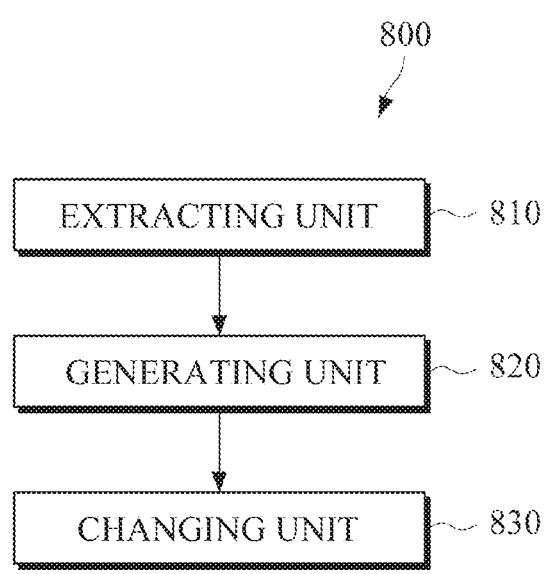
FIG. 8 is a diagram illustrating an example of an apparatus for correcting an error in a contour of a lesion.

If a result of a determination based on the energy value is 'the absence of an error' and a result of a determination based on the estimation information is 'the presence of an error' (case 2), the apparatus requests an error correction apparatus illustrated in FIG. 8 to correct the contour of the lesion. The error correction apparatus corrects a contour of the lesion in a two-dimensional image for use in generating the estimation information. The error detection apparatus generates corrected estimation information based on information about the corrected lesion in the image frame, and re-determines the presence or absence of an error in the contour of the lesion in the target image frame based on the generated corrected estimation information.

If a result of a determination based on the energy value is 'the presence of an error' and a result of a determination based on the estimation information is 'the absence of an error' (case 3), the apparatus requests the error correction apparatus illustrated in FIG. 8 to correct the contour of the lesion. The error correction apparatus corrects the contour of the lesion in the target image frame. The error detection apparatus calculates a corrected energy value that corresponds to the corrected contour of the lesion in the target image frame, and re-determines the presence or absence of an error in the contour of the lesion in the target image frame based on the calculated corrected energy value.

If a result of a determination based on the energy value is 'the presence of an error' and a result of a determination based on the estimation information is 'the presence of an error' (case 4), the error detection apparatus makes a final determination that an error is present in a contour of a lesion in a target image frame.

Accordingly, the error detecting unit is capable of accurately detecting an error in a contour of a lesion by determining the presence or absence of an error in a contour of a lesion in a target image frame based on two determination results.

FIG. 8 is a diagram illustrating an example of an apparatus for correcting an error in a contour of a lesion. Referring to FIG. 8, an apparatus 800 includes an extracting unit 810, a generating unit 820, and a changing unit 830.

The extracting unit 810 extracts a contour of a lesion in each of a plurality of two-dimensional image frames that form a three-dimensional image. For example, the extracting unit 810 may perform image segmentation on each of the two-dimensional image frames to extract a contour of the lesion in each of the two-dimensional image frames. Image segmentation is well known in the art, and thus will not be described in detail here.

The generating unit 820 generates a reference lesion contour on the basis of a contour of a lesion in least one of two-dimensional image frames preceding and subsequent to a target image frame. For example, the generating unit 820 overlays at least two preceding or subsequent image frames with respect to the target image frame among the two-dimensional image frames on each other, and sets one of an outermost contour of overlaid lesions in the overlaid image frames, an innermost contour of the overlaid lesions, an intermediate contour of the overlaid lesions, and an average contour of the overlaid lesions as the reference lesion contour. The intermediate contour is a middle contour that connects intersection points of the overlaid lesions. The average contour is a contour obtained by averaging the contours of the overlaid lesions.

As another example, the generating unit 820 estimates a contour of a lesion in a target image frame based on changes in the contours of the overlaid lesions, and generates a reference lesion contour based on the estimated contour. The generation of the reference lesion contour will be described in detail with reference to FIGS. 9 and 10.

The changing unit 830 modifies the reference lesion contour to generate one or more lesion contour candidates. The changing unit 830 changes the contour of the lesion in the target image frame to one of the lesion contour candidates.

The changing unit 830 may calculate energy values corresponding to the respective lesion contour candidates based on information about pixels in the surroundings of the lesion contour candidates. The changing unit 830 may calculate a similarity between each lesion contour candidate and the reference lesion contour. The changing unit 830 may select one of the lesion contour candidates on the basis of the calculated energy values and the calculated similarities. The changing unit 830 may change the contour of the lesion in the target image frame to the selected lesion contour candidate.

The changing unit 830 may modify the reference lesion contour within a pre-set range. For example, the pre-set range may reach up to the outermost contour and shrink to the innermost contour. As another example, the maximum pre-set range may be larger by a predetermined size than one of the outermost contour, the intermediate contour, the average contour, and the estimated contour and the minimum pre-set range may be smaller by a predetermined size than one of the innermost contour, the intermediate contour, the average contour, and the estimated contour. The pre-set range will be described in detail later with reference to FIGS. 11A to 11E.

The error correction apparatus may generate the reference lesion contour based on contours of lesion in the two-dimensional image frames that neighbor the target image frame, and correct a contour of the lesion in the target image frame based on one of lesion contour candidates that are generated by modifying the reference lesion contour, thereby accurately correcting the contour of the lesion in the target image frame.

Accordingly, the error correction apparatus is capable of accurately correcting a contour of a lesion using contours of lesions in two-dimensional image frames preceding and subsequent to the target image frame.

Figure 9:
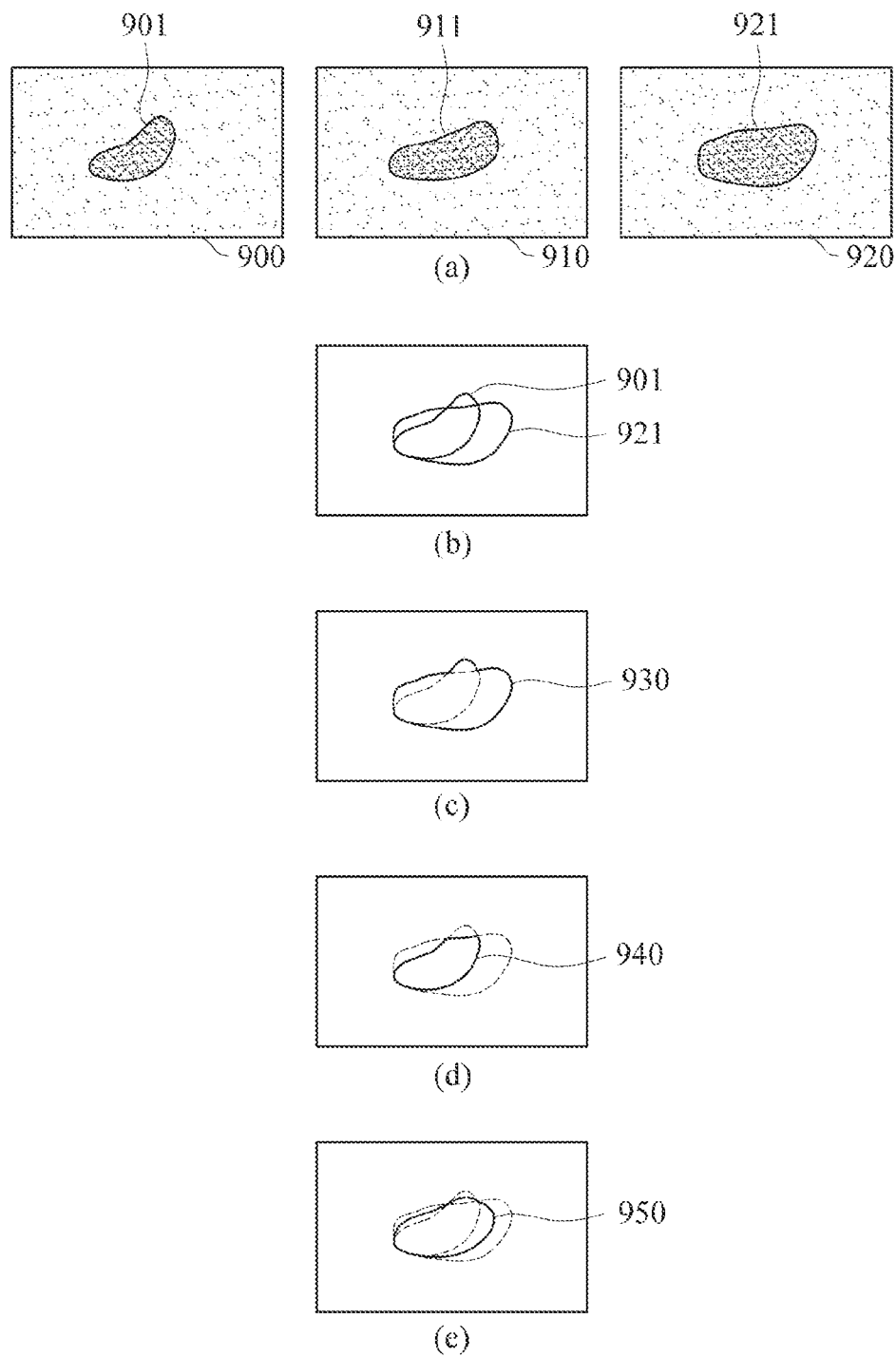
FIG. 9 is a diagram illustrating an example of a process of an error correction apparatus that generates a reference lesion contour.

FIG. 9 is a diagram illustrating an example of a process of an error correction apparatus that generates a reference lesion contour. Referring to (a) of FIG. 9, the error correction apparatus extracts a first lesion contour 901, a second lesion contour 911, and a third lesion contour 921 from a first image frame 900, a second image frame 910, and a third image frame 920, respectively. The first image frame 900, the second image frame 910, and the third image frame 920 form a three-dimensional image.

Referring to (b) of FIG. 9, under the assumption that the second image frame 910 is a target image frame, the error correction apparatus overlays the first image frame 900 and the third image frame 920 on each other, and then generates a reference lesion contour based on overlaid lesion contours 901 and 921 of the overlaid image frames 900 and 920.

Referring to (c) of FIG. 9, the error correction apparatus may set an outermost contour 930 among the overlaid lesion contours 901 and 921 as the reference lesion contour.

Referring to (d) of FIG. 9, the error correction apparatus may set an innermost contour 940 among the overlaid lesion contours 901 and 921 as the reference lesion contour.

Referring to (e) of FIG. 9, the error correction apparatus may set an average contour 950 of the overlaid lesion contours 901 and 920 as the reference lesion contour.

Figure 10A:
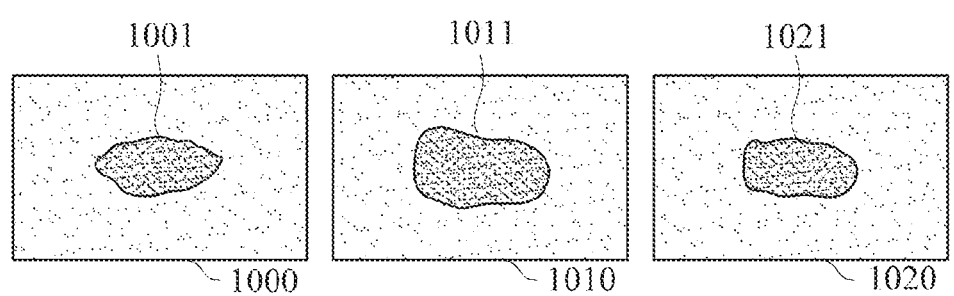

FIGS. 10A to 10D are diagrams illustrating another example of a process of an error correction apparatus that generates a reference lesion contour. Referring to FIG. 10A, the error correction apparatus extracts a first lesion contour 1001, a second lesion contour 1011, and a third lesion contour 1021 from a first image frame 1000, a second image frame 1010, and a third image frame 1020, respectively. The first image frame 1000, the second image frame 1010, and the third image frame 1020 form a three-dimensional image.

Referring to FIG. 10B, under the assumption that the second image frame 1010 is a target image frame, the error correction apparatus extracts feature information 1030 about the first lesion contour 1001 of the first image frame 1000 and feature information 1040 about the third lesion contour 1021 of the third image frame 1020. In the example illustrated in FIG. 10B, the feature information includes information about a lesion, such as similarity information, area information, center point information, circumference information, lateral length information, vertical length information, longest axis length information, and shortest axis length information.

Referring to FIG. 10C, the error correction apparatus estimates feature information 1050 about the lesion contour 1011 of the second image frame 1010 based on changes in the extracted feature information 1030 and 1040.

Figure 10D:
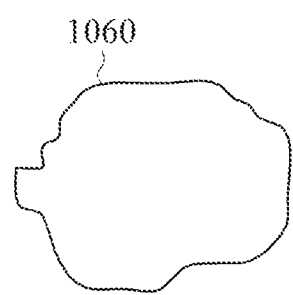

Referring to FIG. 10D, the error correction apparatus generates a lesion contour 1060 based on the estimated feature information 1050, and then generates the reference lesion contour based on the generated lesion contour 1060.

Figure 11A:
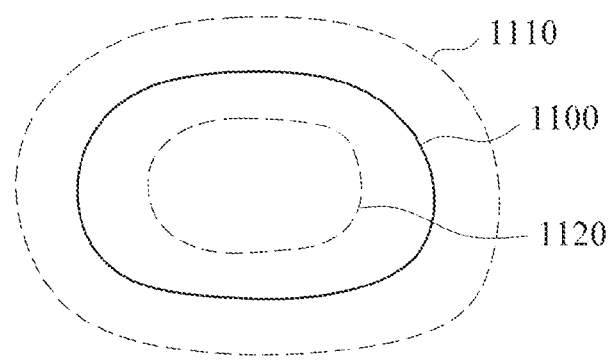

FIGS. 11A to 11E are diagrams illustrating an example of a process of an error correction apparatus that selects one of lesion contour candidates. Referring to FIG. 11A, the error correction apparatus modifies a reference lesion contour 1100 within a range from a minimum lesion contour 1120 to a maximum lesion contour 1110. For example, the maximum lesion contour may be the outermost contour and the minimum lesion contour may be the innermost contour. As another example, the maximum lesion contour may be set by increasing one of the outermost contour, an intermediate contour, an average contour, and an estimated contour by a predetermined size, and the minimum lesion contour may be set by reducing one of the innermost contour, an intermediate contour, an average contour, and an estimated contour by a predetermined size.

Figure 11B:
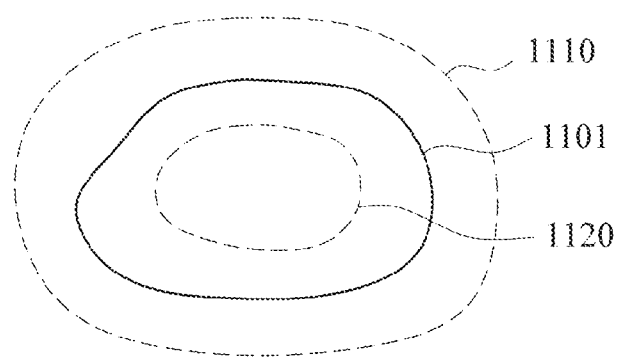

Referring to FIG. 11B, the error correction apparatus generates a first lesion contour candidate 1101 by stretching or contracting part of the reference lesion contour 1100 in FIG. 11A.

Figure 11C:
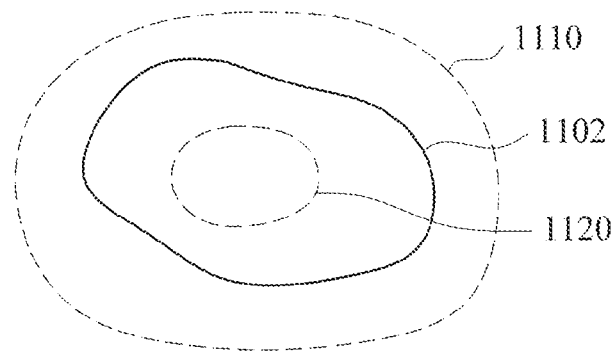

Referring to FIG. 11C, the error correction apparatus generates a second lesion contour candidate 1102 by stretching one part and contracting another part of the reference lesion contour 1100 in FIG. 11A.

Figure 11D:
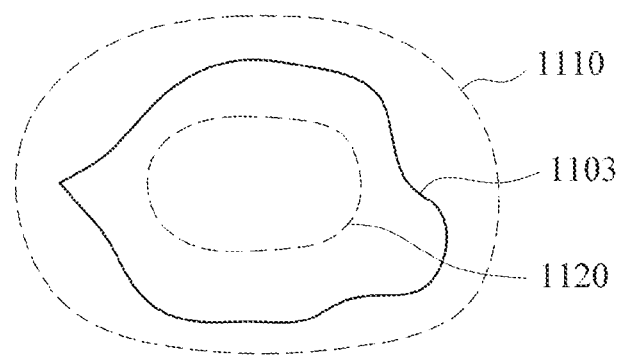

Referring to FIG. 11D, the error correction apparatus generates a third lesion contour candidate 1103 by stretching one part and contracting another part of the reference lesion contour 1100 in FIG. 11A.

Referring to FIG. 11E, the error correction apparatus calculates energy values that respectively correspond to the first lesion contour candidate 1101, the second lesion contour candidate 1102, and the third lesion contour candidate 1103 based on information about pixels in surroundings of the first, second, and third lesion contour candidates 1101, 1102, and 1103. The error correction apparatus calculates a respective similarity between each of the lesion contour candidates 1101, 1102, and 1103 and the reference lesion contour 1100. The example illustrated in FIGS. 11A to 11E assumes that the larger the energy value is, the higher the probability of the absence of an error in a lesion contour candidate is, and that the larger the similarity is, the more the lesion contour candidate is similar to the reference lesion contour. However, such settings may be varied by a user.

The error correction apparatus selects a lesion contour candidate that has the largest sum of the calculated energy value and the calculated similarity. For example, the error correction apparatus selects the third lesion contour candidate 1103 that has the largest sum '42' of the calculated energy value and the calculated similarity. The error correction apparatus changes a contour of a lesion in a target image frame to the selected lesion contour candidate.

Accordingly, the error correction apparatus generates lesion contour candidates by modifying a reference lesion contour within a pre-set range, and changes a contour of a lesion in the target image frame to one of the lesion contour candidates, thereby accurately correcting the contour of the lesion in the target image frame.

Figure 12:
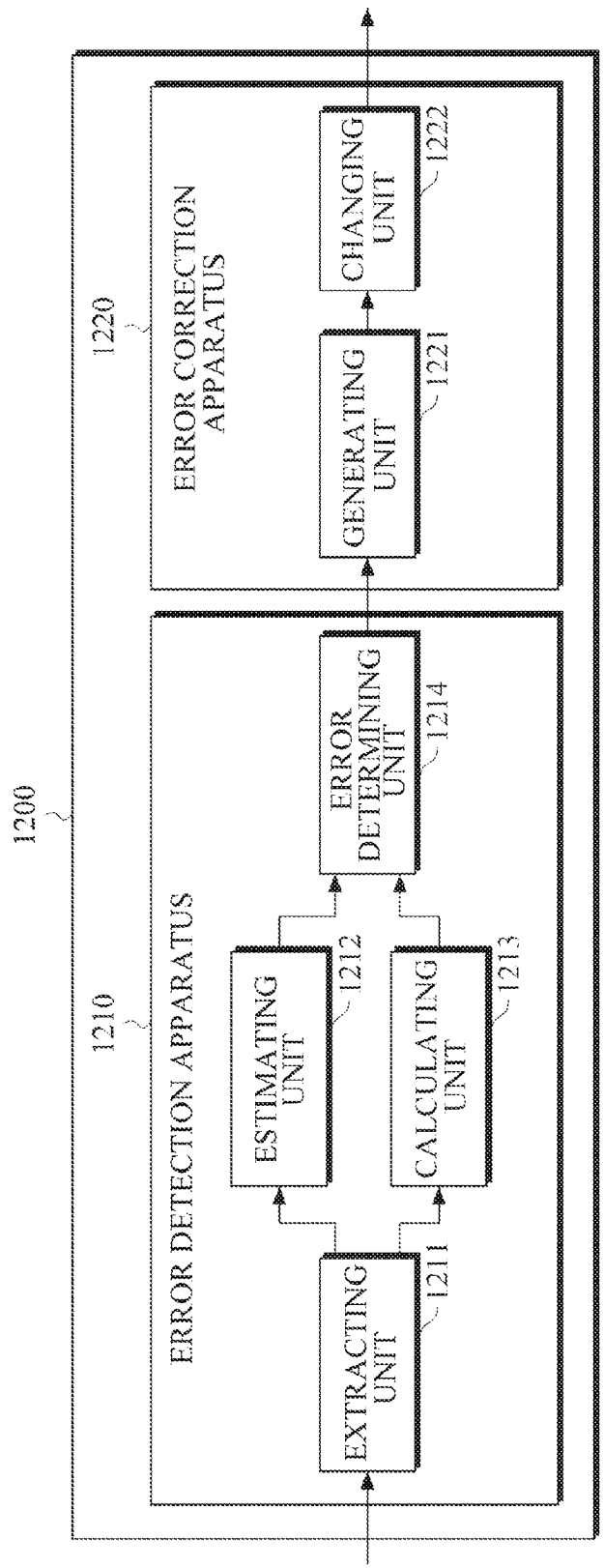
FIG. 12 is a diagram illustrating an example of an apparatus for inspecting an error in a contour of a lesion.

FIG. 12 is a diagram illustrating an example of an apparatus for inspecting an error in a contour of a lesion. Referring to FIG. 12, an apparatus 1200 includes an error detection apparatus 1210 and an error correction apparatus 1220.

The error detection apparatus 1210 includes an extracting unit 1211, an estimating unit 1212, a calculating unit 1213, and an error determining unit 1214.

The extracting unit 1211 extracts a contour of a lesion in each of a plurality of two-dimensional image frames that form a three-dimensional image. For example, the extracting unit 1211 may perform image segmentation on the two-dimensional image frames to extract the contour of the lesion in each of the two-dimensional image frames. Image segmentation is well known in the art, and thus will not be described in detail here.

The estimating unit 1212 generates estimation information about a lesion in a target image frame on the basis of information about a lesion in at least one of two-dimensional image frames preceding and subsequent to the target image frame. For example, the estimating unit 1212 may generate estimation information about the lesion in the target image frame based on changes in information about a lesion in at least one of image frames preceding and subsequent to the target image frame. The estimation information may reflect the changes of the lesion since it is generated based on the changes in the information about the lesion.

The calculating unit 1213 calculates energy values that correspond to a contour of the lesion in the target image frame based on information about pixels in the surroundings of the contour of the lesion in the target image frame.

The error determining unit 1214 determines whether or not an error is present in the contour of the lesion in the target image frame based on at least one of the estimation information about the lesion in the target image frame and the energy value corresponding to the contour of the lesion in the target image frame.

The extracting unit 1211, the estimating unit 1212, the calculating unit 1213, and the error determining unit 1214 function the same as the extracting unit 110, the estimating unit 120, the calculating unit 130, and the error determining unit 140 shown in the example illustrated in FIG. 1. Accordingly, a detailed discussion of the operation of the extracting unit 1211, the estimating unit 1212, the calculating unit 1213, and the error determining unit 1214 will be omitted for conciseness.

The error correction apparatus 1220 includes a generating unit 1221 and a changing unit 1222.

In response to the error determining unit 1214 determining the presence of an error, the generating unit 1221 generates a reference lesion contour based on a contour of a lesion in at least one of two-dimensional image frames preceding and subsequent to the target image frame. For example, the generating unit 1221 overlays at least two two-dimensional image frames preceding or subsequent to the target image frame on each other, and sets one of an outermost contour of overlaid lesions in the overlaid image frames, an innermost contour of the overlaid lesions, an intermediate contour of the overlaid lesions, and an average contour of the overlaid lesions as a reference lesion contour.

As another example, the generating unit 1221 estimates a contour of the lesion in the target image frame based on changes in contours of lesions in at least two of two-dimensional image frames preceding and subsequent to the target image frame, and sets the estimated lesion contour as the reference lesion contour.

The changing unit 1222 generates one or more lesion contour candidates by modifying the reference lesion contour. The changing unit 1222 changes the lesion contour in the target image frame to one of the lesion contour candidates.

The changing unit 1222 calculates energy values that respectively correspond to the lesion contour candidates based on information about pixels in the surroundings of each lesion contour candidate. The changing unit 1222 calculates a respective similarity between each of the lesion contour candidates and the reference lesion contour. The changing unit 1222 selects one of the lesion contour candidates on the basis of the calculated energy values and the calculated similarities. The changing unit 1222 changes the lesion contour in the target image frame to the selected lesion contour candidate.

The changing unit 1222 modifies the reference lesion contour within a pre-set range. For example, a maximum lesion contour may be the outermost contour and a minimum lesion contour may be the innermost contour. As another example, the maximum lesion contour may be set by increasing one of the outermost contour, an intermediate contour, an average contour, and an estimated contour by a predetermined size, and the minimum lesion contour may be set by reducing one of the innermost contour, an intermediate contour, an average contour, and an estimated contour by a predetermined size.

The error detection apparatus 1220 re-determines the presence or absence of an error in the contour of the lesion that is corrected by the changing unit 1222.

Accordingly, the error inspection apparatus is able to accurately detect an error in the contour of the lesion using the estimation information about the lesion in the target image frame or the energy value corresponding to the contour of the lesion.

Also, the error inspection apparatus generates a reference lesion contour based on a contour of a lesion in each of two-dimensional image frames that neighbor the target image frame, and changes a contour of a lesion in the target image frame to one of lesion contour candidates that are produced by modifying the reference lesion contour, thereby accurately correcting the contour of the lesion in the target image frame.

Figure 13:
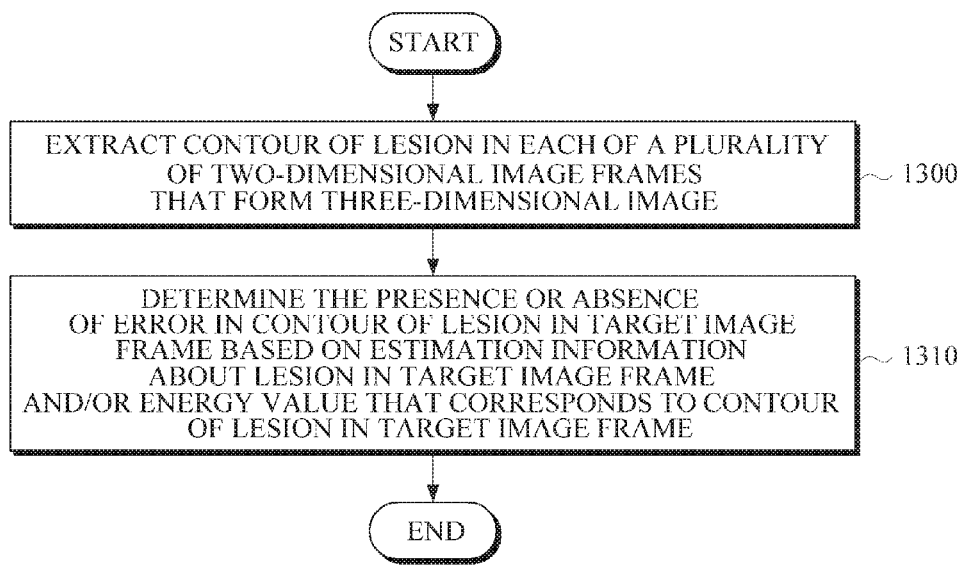
FIG. 13 is a flowchart illustrating an example of a method of detecting an error in a contour of a lesion.

FIG. 13 is a flowchart illustrating an example of a method of detecting an error in a contour of a lesion. Referring to FIG. 13, in 1300, an error detection apparatus extracts a contour of a lesion in each of a plurality of two-dimensional image frames that form a three-dimensional image. The error detection apparatus may perform image segmentation on the two-dimensional image frames, thereby extracting the contour of the lesion in each of the image frames. Image segmentation is well known in the art, and thus will not be described in detail here.

In 1310, the error detection apparatus determines the presence or absence of an error in a contour of a lesion in a target image frame based on estimation information about the lesion in the target image frame and/or an energy value that corresponds to the contour of the lesion in the target image frame. The error detection apparatus generates the estimation information about the lesion in the target image frame based on information about a lesion in at least one of image frames preceding and subsequent to the target image frame. The error detection apparatus calculates an energy value that corresponds to the contour of the lesion in the target image frame on the basis of information about pixels in the surroundings of the contour of the lesion in the target image frame. The error correction apparatus determines the presence or absence of an error in a contour of a lesion in the target image frame based on a result of a comparison between a predefined energy value and the energy value that corresponds to the contour of the lesion in the target image frame, or determines the presence or absence of an error in a contour of the lesion in the target image frame based on the distribution of energy values that correspond to contours of lesions in the two-dimensional image and/or determines the presence or absence of an error in a contour of the lesion in the target image frame based on a result of a comparison between detailed information about the lesion in the target image frame and detailed information of the estimation information. Thereafter, based on a result of the determination, the error detection apparatus makes a final determination on the presence or absence of an error in the contour of the lesion in the target image frame.

Figure 14:
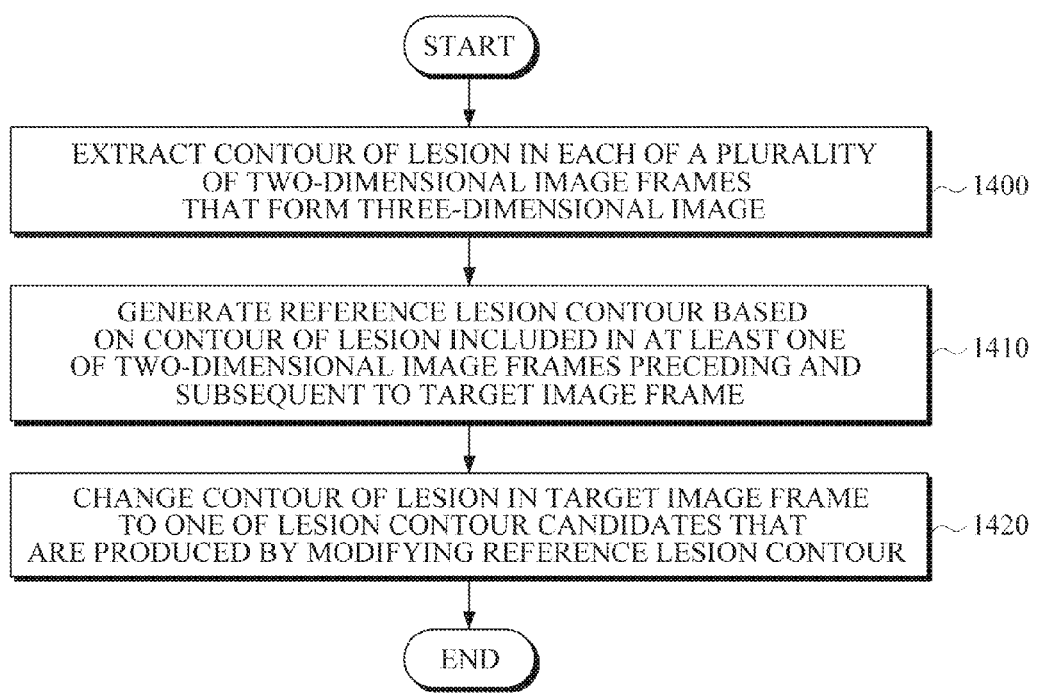
FIG. 14 is a flowchart of an example of a method of correcting an error in a contour of a lesion.

FIG. 14 is a flowchart of an example of a method of correcting an error in a contour of a lesion. Referring to FIG. 14, in 1400, an error correction apparatus extracts a contour of a lesion in each of a plurality of two-dimensional image frames that form a three-dimensional image. For example, the error correction apparatus may perform image segmentation on the two-dimensional image frames to extract a contour of a lesion in each two-dimensional image frame. Image segmentation is well known in the art, and thus will not be described in detail here.

In 1410, the error correction apparatus generates a reference lesion contour based on a contour of a lesion in at least one of two-dimensional image frames preceding and subsequent to a target image frame. For example, the error correction apparatus overlays at least two two-dimensional image frames preceding and subsequent to the target image frame on each other, and sets one of an outermost contour overlaid lesions in the overlaid frames, an innermost contour of the overlaid lesions, an intermediate contour of the overlaid lesions, and an average contour of the overlaid lesions as a reference lesion contour.

As another example, the error correction apparatus estimates a contour of a lesion in the target image frame based on changes in contours of lesions in at least two of two-dimensional image frames preceding and subsequent to the target image frame, and sets the estimated contour as the reference lesion contour.

In 1420, the error correction apparatus changes the contour of the lesion in the target image frame to one of lesion contour candidates that are produced by modifying the reference lesion contour. For example, the error correction apparatus modifies the reference lesion contour within a pre-set range. Then, the error correction apparatus calculates respective energy values that correspond to the lesion contour candidates based on information about pixels in the surroundings of each lesion contour candidate. Also, the error correction apparatus calculates a respective similarity between each lesion contour candidate and the reference lesion contour. The error correction apparatus selects one of the lesion contour candidates based on the calculated energy values and the calculated similarities. The error correction apparatus changes the contour of the lesion in the target image frame to the selected lesion contour candidate.

The various units in FIGS. 1, 8, and 12 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this invention has been particularly shown and described with reference to various examples, it will be understood by those of ordinary skill in the art that various changes in form and details may be made in these examples without departing from the spirit and the scope of the invention as defined by the claims and their equivalents. The examples described herein should be considered in a descriptive sense only and not for purposes of limitation. Descriptions of features or aspects in one example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the invention, but by the claims and their equivalents, and all variations falling within the scope of the claims and their equivalents are to be construed as being included in the invention.

What is claimed is:

1. An apparatus for changing a contour of a lesion in a medical image, the apparatus comprising:
    a memory configured to store instructions; and
    at least one processor, upon executing the stored instructions, configured to:
        generate a first contour of a lesion in a first image frame which is at least one of two dimensional image frames that form at least one three-dimensional image,
        generate a reference lesion contour, in a target image frame which is different from the first image frame, based on at least one portion of information about pixels in the target image frame,
        modify the reference lesion contour to produce a plurality of lesion contour candidates, and
        conform at least one of the lesion contour candidates as a second contour of a lesion in the target image frame.

2. The apparatus of claim 1, wherein the at least one processor is further configured to modify the reference lesion contour within a pre-set range to produce the lesion contour candidates.

3. The apparatus of claim 1, wherein the at least one processor is further configured to generate estimation information about the lesion contour candidates in the target image frame based on information about at least one lesion in at least one of the two-dimensional image frames that is different from the target image frame.

4. The apparatus of claim 3, wherein the at least one processor is further configured to set, as the reference lesion contour, a lesion contour that is generated based on the estimation information about the lesion contour candidates in the target image frame.

5. The apparatus of claim 1, wherein the at least one processor is further configured to calculate pixel value that corresponds to the lesion contour candidates in the target image frame based on information about pixels inside the lesion contour candidates in the target image frame.

6. An apparatus for changing a contour of a lesion in a medical image, the apparatus comprising:
    a memory configured to store instructions; and
    at least one processor, upon executing the stored instructions, configured to:
        generate a first contour of a lesion in a first image frame which is at least one of two dimensional image frames that form at least one three-dimensional image,
        generate a reference lesion contour in a target image frame which is different from the first image frame,
        modify the reference lesion contour to generate a plurality of lesion contour candidates,
        calculate a similarity between a portion of information of the first contour of the lesion in the first image frame and a portion of information of the at least one of the lesion contour candidates, and
        confirm at least one of the lesion contour candidates as a second contour of a lesion in the target image frame.

7. The apparatus of claim 6, wherein the at least one processor is further configured to modify the reference lesion contour within a pre-set range to produce the lesion contour candidates.

8. The apparatus of claim 6, wherein the at least one processor is further configured to generate estimation information about the lesion contour candidates in the target image frame based on information about at least one lesion in at least one of the two-dimensional image frames that is different from the target image frame.

9. The apparatus of claim 8, wherein the at least one processor is further configured to set, as the reference lesion contour, a lesion contour that is generated based on the estimation information about the lesion contour candidates in the target image frame.

10. The apparatus of claim 6, wherein the at least one processor is further configured to calculate pixel value that corresponds to the lesion contour candidates in the target image frame based on information about pixels inside the lesion contour candidates in the target image frame.

11. The apparatus of claim 6, wherein the at least one processor is further configured to perform an image segmentation to extract the first lesion contour in the first image frame.

12. The apparatus of claim 6, wherein the first image frame and the target image frame form a three-dimensional image.

13. The apparatus of claim 6, wherein the instructions are distributed over at least one network coupled computer system.

14. A computer program product comprising a non-transitory computer readable storage medium having a computer readable program stored therein, wherein the computer readable program, when executed on a computing device, causes the computing device to:
- generate a first contour of a lesion in a first image frame which is at least one of two-dimensional image frames that form at least one three-dimensional image;
- generate a reference lesion contour in a target image frame which is different from the first image frame;
- modify the reference lesion contour to produce a plurality of lesion contour candidates; and
- confirm at least one of the lesion contour candidates as a second contour of a lesion in the target image frame.

15. The computer program product of claim 14, wherein the computer readable program further causes the computing device to:
- modify the reference lesion contour within a pre-set range to produce the lesion contour candidates.

16. The computer program product of claim 14, wherein the computer readable program further causes the computing device to:
- calculate a similarity between a portion of information of the first contour of the lesion in the first image frame and a portion of information of the at least one of lesion contour candidates.

17. The computer program product of claim 14, wherein the computer readable program further causes the computing device to:
- calculate pixel value that corresponds to the lesion contour candidates in the target image frame based on information about pixels inside the lesion contour candidates in the target image frame.

18. The computer program product of claim 14, wherein the computing device is further configured to compare at least one portion of information of the lesion contour candidates in the target image frame with at least one portion of information of at least one lesion in at least one of two-dimensional image frames that is different from the target image frame.

19. The computer program product of claim 14, wherein the computing device is further configured to perform an image segmentation to extract the first contour of the lesion in the first image frame.

20. The computer program product of claim 14, wherein the first image frame and the target image frame form a three-dimensional image.

* * * * *